United States Patent [19]
Turovski

[11] Patent Number: 5,933,492
[45] Date of Patent: Aug. 3, 1999

[54] METHOD AND SYSTEM FOR DETERMINING AND USING MULTIPLE OBJECT STATES IN A COMPUTER TELEPHONY INTEGRATION SYSTEM

[75] Inventor: Oleg Turovski, San Francisco, Calif.

[73] Assignee: Genesys Telecommunications Laboratories, Inc., San Francisco, Calif.

[21] Appl. No.: 08/786,817

[22] Filed: Jan. 21, 1997

[51] Int. Cl.$^6$ .............................. H04M 3/00; H04M 3/42
[52] U.S. Cl. ......................... 379/265; 379/201; 379/309
[58] Field of Search ................................. 379/201, 207, 379/210, 214, 265, 266, 309

[56] References Cited

U.S. PATENT DOCUMENTS

| | | | |
|---|---|---|---|
| 4,290,141 | 9/1981 | Anderson et al. | 455/2 |
| 4,320,256 | 3/1982 | Freeman | 179/6.04 |
| 4,345,315 | 8/1982 | Cadotte et al. | 364/900 |
| 4,355,207 | 10/1982 | Curtin | 179/18 |
| 4,355,372 | 10/1982 | Johnson et al. | 364/900 |
| 4,439,636 | 3/1984 | Newkirk et al. | 179/7.1 |
| 4,451,700 | 5/1984 | Kempner et al. | 179/2 |
| 4,489,438 | 12/1984 | Hughes | 381/51 |
| 4,517,410 | 5/1985 | Williams et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |
| 4,539,435 | 9/1985 | Eckmann et al. | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Levy et al. | 179/99 |
| 4,578,700 | 3/1986 | Roberts | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | DeFrancesco et al. | 364/408 |
| 4,603,232 | 7/1986 | Kurland et al. | 179/2 |
| 4,611,094 | 9/1986 | Asmuth et al. | 179/7.1 |
| 4,625,276 | 11/1986 | Benton et al. | 364/408 |
| 4,630,200 | 12/1986 | Ohmae et al. | 364/405 |
| 4,630,201 | 12/1986 | White | 364/408 |
| 4,634,809 | 1/1987 | Paulsson et al. | 379/91 |
| 4,649,563 | 3/1987 | Reskin | 379/97 |
| 4,654,482 | 3/1987 | DeAngelis | 379/95 |
| 4,667,287 | 5/1987 | Allen et al. | 364/200 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |

(List continued on next page.)

OTHER PUBLICATIONS

Margie Semilof "Call Centers Go On–Line" Communications Week No Date Available.

*Primary Examiner*—Harry S. Hong
*Attorney, Agent, or Firm*—Donald R. Boys

[57] ABSTRACT

A method for a reporting application to flexibly report the status of an entity in a call center to a requesting application is provided. The entity could be in one or more states. Examples of an entity are a directory number, an agent, a group, a routing point, and an agent place. The requesting application sets the priority of these states belonging to the entity by sending a status priority table to the reporting application. The reporting application reports the status based on the active states of the entity and the priority table. As an example, the reported status could be the active state having the highest priority in the table. This state is reported back to the requesting application. Because different requesting applications could present different priority tables, the reporting application could report different states for the same entity.

12 Claims, 2 Drawing Sheets

U.S. PATENT DOCUMENTS

| | | | |
|---|---|---|---|
| 4,908,850 | 3/1990 | Masson et al. | 379/88 |
| 4,953,204 | 8/1990 | Cuschleg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Furguson et al. | 235/383 |
| 5,261,096 | 11/1993 | Howarth | 365/650 |
| 5,278,977 | 1/1994 | Spencer et al. | 395/575 |
| 5,280,625 | 1/1994 | Howarter et al. | 395/200 |
| 5,343,477 | 8/1994 | Yamada | 371/8.2 |
| 5,392,400 | 2/1995 | Berkowitz et al. | 395/200 |
| 5,444,774 | 8/1995 | Friedes | 379/266 |
| 5,455,903 | 10/1995 | Jollissaint et al. | 395/155 |
| 5,528,678 | 6/1996 | Kaplan | 379/201 |
| 5,530,744 | 6/1996 | Charlambous et al. | 379/265 |
| 5,655,015 | 8/1997 | Walsh et al. | 379/265 X |

…

METHOD AND SYSTEM FOR DETERMINING AND USING MULTIPLE OBJECT STATES IN A COMPUTER TELEPHONY INTEGRATION SYSTEM

FIELD OF THE INVENTION

This invention relates to telephone communications in a call center, and particularly to methods and systems for determining the status of entities therein that could have multiple object states.

BACKGROUND OF THE INVENTION

The telephone is one of the most widely used communication equipments in the world. At first, it was merely a convenient tool to allow people to communicate while they are physically separated. Recently, many companies use telephones to market products and services, provide technical supports to consumer products, allow callers to access their own financial data, etc. Thus, the telephone is becoming a major business and marketing tool.

In order to more effectively use telephone for business and marketing purposes, call centers have been developed. In a call center, a large number of agents handle telephone communication with callers. The matching of calls between callers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the caller who has been assigned that phone number. The software can now route the call to an agent who can best handle the call based on predefined criteria (e.g., language skill, knowledge of products the caller bought, etc.). The software immediately transfers relevant information to a computer screen used by the agent. Thus, the agent can gain valuable information about the caller prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In making a routing decision, the software needs to know the state of all the agents. For example, if an agent is in a busy state (e.g, answering another call), calls will not be routed to that agent. In the prior art CTI system, an agent has only one state. The routing software (as well as other software in the system) makes decisions based on this state. However, this system is inflexible. For example, even though an agent may be busy in performing some tasks (e.g., talking with a co-worker on a non-urgent matter), he/she may still be able to accept a call from a customer if there is no other qualified agent available to take that call. Thus, it is desirable to have a flexible system that can make better use of the resource of a call center.

SUMMARY OF THE INVENTION

The present invention involves a method for flexibly reporting the status of an entity in a call center to a requesting software application. The entity could be currently in one or more states (called the active states) of a plurality of possible states. A first (reporting) software application determines the status of the entity based on (i) the active state(s) of the entity and (ii) a priority list provided by a second (requesting) software application. This reporting software application then reports the status to the requesting software application.

One advantage of this invention is that the requesting software applications determine the priority of the states. Presumably, each requesting software application knows the best way to utilize the state information. Thus, allowing the requesting software application to define priority is much better than reporting the same status to all requesting software applications.

In one embodiment of the present invention, the entities include physical (e.g., queues and routing points, agent directory numbers, and agents) and logical (e.g., agent places, and groups) entities. Each entity is associated with software objects. Each object could have one or more possible states and one or more active states. The requesting software application sets the priority of these possible states for each entity object and present them in the form of, e.g., a status priority tables. This table is sent to the reporting software application. The reporting software application reports the status of an object as the active state having the highest priority.

In another embodiment of the present invention, the requesting software application may request the reporting software application to report the status only once. Alternatively, the requesting software application may request reporting on a continuous basis. The reporting software application can define the frequency of reporting.

The present invention can be used in a single automatic call distributor system and a multiple automatic call distributor system.

These and other features of the present invention will become apparent from the following description when read in conjunction with the accompanying drawings.

DETAILED DESCRIPTION OF THE INVENTION

The present invention comprises novel call center method and system. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
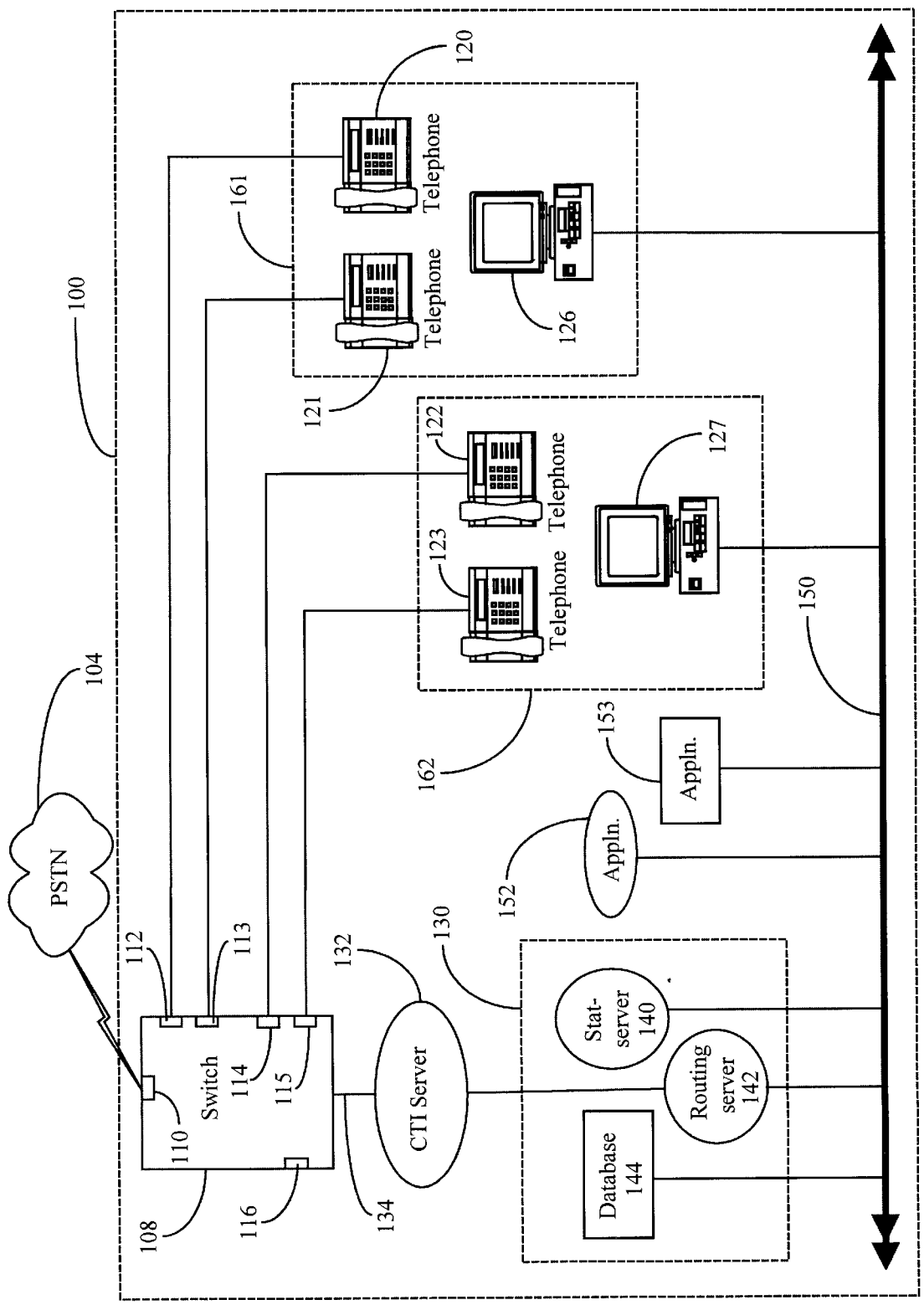
FIG. 1 is a block diagram of a call center that can implement the multiple object state determination system of the present invention.

FIG. 1 is a block diagram of a call center 100 which can be used to implement the present invention. Call center 100 is connected to a public-switched telephone network (PSTN) 104. It comprises a switch 108 for accepting calls from PSTN 104. Switch 108 could be an automatic call distributor (ACD)/private branch exchange (PBX) or a PSTN switch.

Switch 108 contains a high bandwidth port 110 (for connecting to PSTN 104) and a plurality of low bandwidth ports (such as ports 112–115). Some of these low bandwidth ports can be connected to voice-based devices. For example, ports 112–115 are connected to telephones 120–123, respectively. Agents are assigned to handle these telephones. Each of the low bandwidth ports is assigned one or more directory numbers ("DNs").

It has been found that the function performed by a standard switch is rather limited and cannot meet the requirements of a typical call center. For example, it is desirable to provide information about a call to a workstation (such as workstation 126–127) available to each agent. However, a switch cannot search, process and route data to these workstations. Consequently, a new technology, called computer-telephony-integration (CTI), is needed to route a combination of voice and digital data to desired places.

As a way to implement CTI, call center 100 further contains a routing subsystem 130 connected to a CTI server 132, which is in turn connected to switch 108 through a CTI link 134. The communication between switch 108 and CTI server 132 typically follows the X.25 protocol. CTI server 132 provides an interface between routing subsystem 130 and switch 108. Switch 108 notifies CTI server 132 when a call is received. CTI server 132 sends the information to routing subsystem 130, which selects an agent best qualified to answer the call in accordance with predetermined criteria. CTI server 132 then notifies switch 108 to direct the call to the telephone (i.e., DN) of the selected agent while routing subsystem 130 directs data relating to the person placing the call to the workstation of the selected agent.

In one embodiment of the present invention, routing subsystem 130 contains a stat-server 140, a routing server 142, and a database 144. They communicate with one another using a data communication network 150. Stat-server 140 collects and stores historic data relating to all calls, activities of switches, and information and activities of all agents in call center 100. Database 144 contains information of customers, agents, telephone numbers, and various aspects of call center 100. Routing server 142 selects appropriate agents to handle calls using data in stat-server 140 and database 144. After the selection, routing server 142 sends a command to CTI server 132, which in turn instructs switch 108 to route incoming calls to the selected agents.

There may be other CTI-related applications (i.e., software modules) which uses the resource of database 144 and stat-server 140 so as to provide other services or information to the agents in the call center. In FIG. 1, two applications (152 and 153) are shown. Examples of applications are "Agent View" and "Call Center View" marketed by Genesys Telecommunications Laboratories. These applications are connected to data communication network 150.

In a call center, it is common for an agent to manage more than one telephone. The equipments used by an agent is usually set up in a convenient place (such as a desk), called "agent place" in the present application. FIG. 1 shows two exemplary agent places 161 and 162. Agent place 161 contains a workstation 126 and two telephones 120 and 121. Similarly, agent place 162 contains a workstation 127 and two telephones 126 and 127. When an agent occupies an agent place, he/she logs on using either a telephone or a workstation therein. Before the agent leaves the agent place, he/she logs out using the telephone or workstation. Consequently, call center 100 is able to keep track of the current location of each agent.

Stat-server 140 communicates with CTI server 132, routing server 142 and applications 152–153 via a set of application programming interface ("API") commands. Stat-server 140 (working with CTI server 132) can monitor and store activities of switch 108. It also monitors and stores activities of various agents and agent places. In response to inquiry by routing server 142 and applications 152–153 regarding the status of an object of interest (e.g., an agent), stat-server 140 provides a report to routing server 142. In an embodiment where one stat-server is used to manage several switches (which may be located in one or more call centers), stat-server 140 monitors and stores activities of all the switches, all the agents and all the agent places served by these switches. A detailed description of a multiple call center architecture which may use the stat-server of the present invention is disclosed in a copending patent application entitled "System and Method for Operating a Plurality of Call Centers" filed Jan. 13, 1997 and assigned to the same assignee of the present application. This patent application is incorporated herein by reference.

It is observed that most call center entities (e.g., telephones and agents) could simultaneously have multiple states. For example, an agent telephone is designed to handle several activities at the same time. Thus, the agent may use the same telephone to talk to one customer, put another person (e.g., a co-worker) on hold, and waiting for an incoming call. Under prior art systems, this presents a reporting problem when the stat-server reports the state of the telephone to other CTI applications because it is not clear which state (out of several states) should be reported.

The present invention is a method and system which take advantage of the multiple states. It realizes that different CTI applications need to use state-related information differently. For example, a regular routing routine would consider an agent busy if he/she is talking on a telephone or using a workstation to enter data. However, an application which handles high priority calls (e.g., emergency calls or calls from valued customers) would consider the same agent available as long as he/she is logged on to the agent place. This is because the agent can stop working with the workstation or place a call on hold if there is an emergency phone call. Thus, the present invention allows an application to define which of the several states they wish to be informed.

An embodiment of the present invention is now described. In this embodiment, various entities in a call center are associated with software objects. The following are some examples of these objects:

(a) Queues and Routing Points: These are hardware circuits in switches and are represented as objects. Queue implements hardware controlled ACD mechanism. Routing point, sometimes called control directory number ("CDN"), can be controlled by software applications (such as a routing routine).

(b) Agent DNs: They are hardware ports in a switch and are represented as objects. Each DN is associated with one or more properties. For example, some DNs can access another DN directly; some DNs are associated with queues; some DNs are limited to outgoing calls; and some DNs have a period of unavailability after completion of a previous call. In a specific example, some of the switches manufactured by Northern Telecom contain basically two kinds of DNs, position and extension. Extension DNs can be accessed directly by a telephone and can initiate outgoing calls. Position DNs are associated with one or more queues. They can be accessed only through these queues and cannot initiate outgoing calls.

(c) Other specific DNs: They are DNs connected to specific devices, such as voice mail systems, interactive voice response units, etc. These DNs are represented as objects.

(d) Agent Places: They are logical spaces each containing items associated with the space (e.g., one or more DNs, possibly attached to different switches, and workstations). In a physical implementation, these places could be desks. When an agent makes login to one item in a place, he (she) becomes logically logged in for the whole place. Each place is represented as an object and associated with a PlaceID.

(e) Agents: Persons (objects) identified by an AgentIDs. Agents can move between places dynamically. The stat-server has a special routine for dynamically keeping track of the locations of all the agents. For example, an agent can work from 9:00 AM till 13:00 (i.e., 1:00 PM) at a first place; makes a logout (e.g., for lunch) and then makes a login at a second place at 14:00. The agent location tracking routine maintains the information so that the routing server (and other applications) knows which DN to dial to reach the agent. Each agent may also have a "home place," which is a default value if the agent cannot be dynamically tracked.

(f) Groups: A number of agents in any combination. Group objects are identified by GroupIDs. There are at least two types of groups. The first type (identified herein as SObjectGroupAgents) contains a list of AgentIDs. In this case, the stat-server tracks all agent movements and collect statistics only for included agents. Examples are groups with particular skills. The second type (identified herein as SObjectGroupPlaces) contains a list of agent places (PlaceIDs). Examples of places in the lists are training room, main office, second floor, etc. In this case, the stat-server tracks events related to places included in the list because it does not matter who works in these places.

Figure 2:
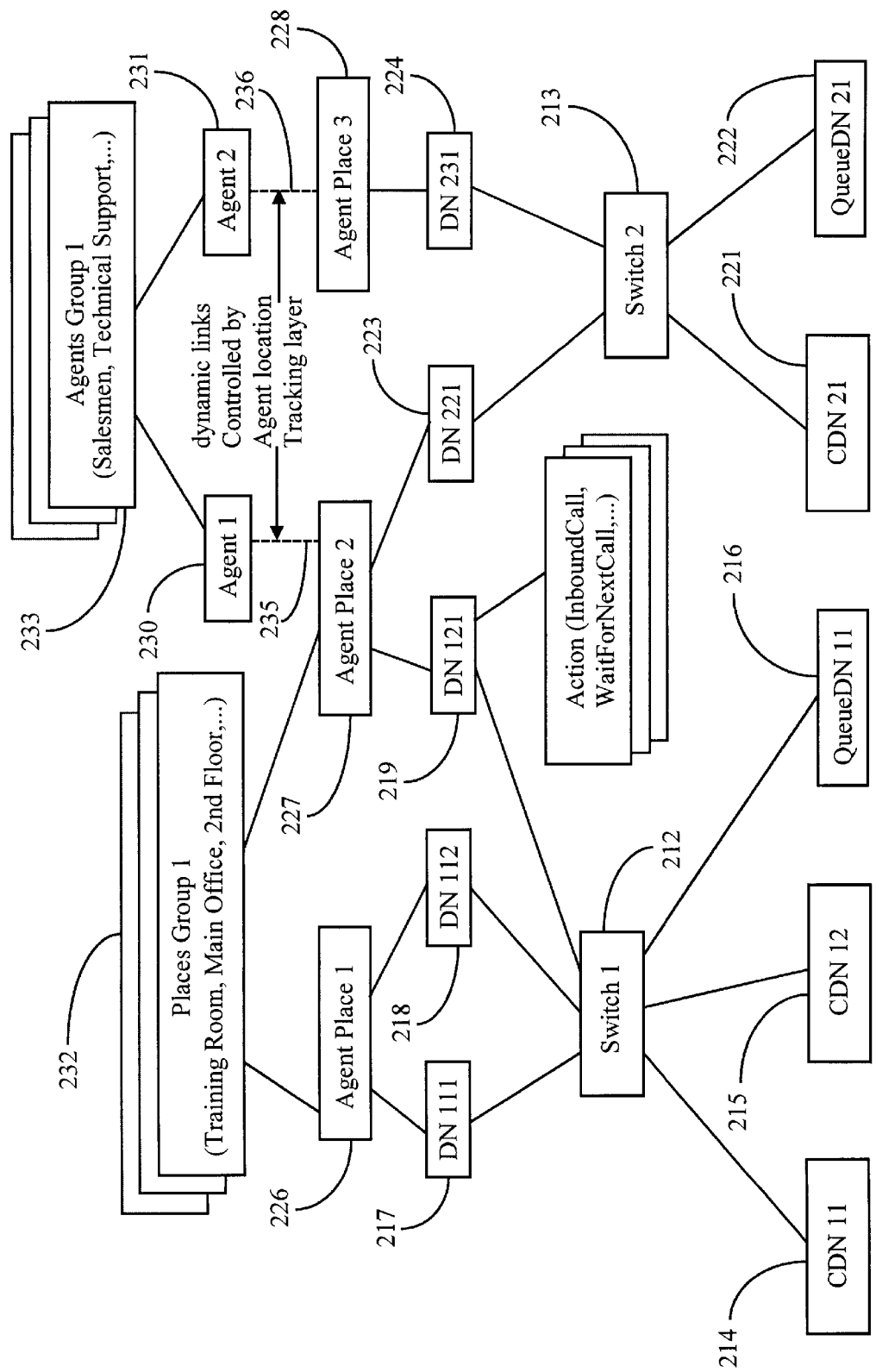
FIG. 2 is a schematic diagram illustrating objects used in a stat-server of the multiple call centers system of the present invention.

FIG. 2 is used to illustrate the above described objects. It shows two switch objects 212 and 213 simulating two physical switches in one or more call centers. Switch object 212 comprises the following resources: CDN objects 214 and 215, queueDN object 216, and DN objects 217–219. Similarly, switch object 213 comprises the following resources: CDN object 221, queueDN object 222, and DN objects 223–224. These objects represent the corresponding CDN, queues, and agent DNs in the physical switches.

The agent DN objects 217–219 and 223–224 are also included in agent place objects. In this example, agent place object 226 includes DN objects 217 and 218, agent place object 227 includes DN objects 219 and 223, and agent place object 228 includes DN object 224. It should be noted that the DNs from two different switches can be associated with the same agent place.

Some of the agent place objects can be grouped together to form place group objects. In FIG. 2, only one place group object 232 is shown.

FIG. 2 also shows a plurality of agent objects, such as objects 230 and 231. In this example, agent object 230 is dynamically link to agent place object 227 using the above mentioned agent location tracking routine, shown in FIG. 3 as a dashed line 235. Similarly, agent object 231 is dynamically link to agent place object 228 using the above described dynamical tracking routine (shown as a dashed line 236 in FIG. 2).

Some of the agent objects can be grouped into agent group objects. In FIG. 2, only one agent group object 233 is shown.

Stat-server 190 provides a set of APIs for its clients to obtain statistics for various objects, such as objects associated with agents, agent groups, agent places, place groups, route points, queues, etc. Statistics could be current objects states representation (e.g., current agent status, current number of active calls in a group, etc.) or historical states representation. Historical representation are accumulated information for certain time intervals (e.g., total number of calls, total talk time, average talk time, etc.). Thus, the clients have to specify the time interval of interest. Examples of time intervals are:

(a) SGrowingWindow: The start time is fixed (e.g., 9:00 AM) while the end time is sliding (e.g., "till now"). For example, the client may request the total number of calls between 9:00 AM and now.

(b) SSlidingWindow: The time interval is fixed while the start and end times are sliding. Example: the average call length for the past hour.

Returning now to the description of objects, each object has one or more states. In one embodiment of the present invention, agent DN objects may have the states shown in Table 1. It should be noted that the number and nature of states are implementation details, and thus, can easily be changed by persons skilled in the art.

TABLE 1

| | | |
|---|---|---|
| (1) | NotMonitored: | The CTI server is not currently tracking the status of this agent DN. Consequently, the stat-server is not accumulating statistical information for this DN. |
| (2) | Monitored: | The agent DN is monitored by the CTI server. |
| (3) | LoggedIn: | It indicates that an agent has logged in to the agent DN. |
| (4) | OnHook: | It indicates that an agent DN is on hook and is waiting for a call. |
| (5) | WaitForNextCall: | This is active at almost all time, even when this agent DN has active calls or when there is no agent (for the possibility of leaving a voice mail message). The only situation in which WaitForNextCall is not active is when a predetermined key is pressed (see NotReadyForNextCall below). |
| (6) | OffHook: | It indicates that the telephone receiver is offhook. However, other states can be active even when the receiver is offhook (e.g., WaitForNextCall). |
| (7) | CallDialing: | It indicates that an agent has dialed a call but that the call is not yet established. |
| (8) | CallRinging: | It relates to an action occuring on an agent DN from the moment an inbound call begins ringing to the time just before the handling of the call by an agent. |
| (9) | NotReadyForNextCall: | This refers to a hardware condition preventing the receipt of calls. It is usually activated by pressing a predetermined key. |
| (10) | OfflineWorkType1: | It indicates that an agent is offline to do work that can be classified as type 1. |
| (11) | OfflineWorkType2: | It indicates that an agent is offline to do work that can be classified as type 2. |
| (12) | CallOnHoldUnknown: | It indicates that a call of unknown type is on hold. |
| (13) | CallOnHoldConsult: | It indicates that a consulting call is on hold. |
| (14) | CallOnHoldInternal: | It indicates that an internal call is on hold |
| (15) | CallOnHoldOutbound: | It indicates that an outbound call is on hold |
| (16) | CallOnHoldInbound: | It indicates that an inbound call is on hold |

TABLE 1-continued

| | | |
|---|---|---|
| (17) | CallUnknown: | It indicates that the CTI server cannot determine whether the call is a consult, internal, outbound, inbound or on-hold call. |
| (18) | CallConsult: | It indicates that a consulting call is in progress. |
| (19) | CallInternal: | It indicates that call between two extensions (internal calls) is in progress (i.e., when no prefix is used) |
| (20) | CallOutbound: | It indicates that an outbound call is in progress. |
| (21) | CallInbound: | It indicates that an inbound call is in progress. |
| (22) | LoggedOut: | It indicates that an agent has logged out from the agent DN. |
| (23) | CallDialed: | It indicates that a successful result was achieved when a call was dialed. |
| (24) | CallAbandonedFromDialing: | It indicates that during the process of a call dialing (and before another party answers), the agent hung up the phone. |
| (25) | CallAnswered: | It indicates that a call was answered. |
| (26) | CallAbandonedFromRinging: | It indicates that another party hung up the phone while a call was ringing. |
| (27) | CallAbandonedFromHolding: | It indicates that another party hung up the phone while a call was on hold. |

The above listed states correspond to actions that can be "executed" by an agent DN. As mentioned above, an agent DN could be in a plurality of these states at the same time (called herein the "active states"). In one embodiment of the present invention, the stat-server of the present invention reports to its clients an agent DN status that is equal to the active state having the highest priority. In the present invention, the priority is set by the clients of the stat-server. This is accomplished by the client sending a status priority table ("SET") to the stat-server as part of the parameters in requesting information on the status of an agent DN. This table contains the same states shown in the listing of Table 1 such that these states are arranged in a priority order defined by that client. In reporting to the client, the stat-server reports a status corresponding to the active state of the agent DN having the highest priority as defined in the received SPT. It should be noted that the reported status could be the active state that corresponds to other priorities on the SPT. If the client requesting the information does not provide a SPT, a default SPT is used. Further, the client may provide a different SPT at separate requests for information.

One advantage of this aspect of the present invention is that each client can obtain information it deems to be the most pertinent. In the prior art system, the stat-server reports only one status for an agent DN to all the clients that request the information. In the present invention, the stat-server can report different status for the same agent DN to different clients, depending on the SPT parameters sent by the clients. Because each client receives the information it wants, the resource of the call center can be better utilized.

As pointed out above, each agent may have access to two or more telephones (i.e., agent IDNs). In this case, the client may define an agent SPT indicating the priority of the actions in both agent DNs.

As an example, it is assumed that an agent has access to two agent DNs: the first DN has a state of "OfflineWorkType1" and the second DN has a state of "WaitForNextCall." The status of the agent reported to the client is "OfflineWorkType1" if it has a higher priority. As another example, a client (e.g., routing server 142) of the stat-server may consider the status of an agent to be "WaitForNextCall" when all the agent DNs associated with the agent have the "WaitForNextCall" state. This corresponds to the case when the agent is not actively performing any call center related activity (e.g., answering a call or using the workstation), and as a result, all the agent DNs are not being used and are waiting for a call. This priority arrangement is achieved by putting "WaitForNextCall" as the action having the lowest priority in an agent SPT. However, if there is a special or urgent call, routing server 142 may want to consider the status of the agent to be "WaitForNextCall" when there is at least one agent DN associated with the agent having the "WaitForNextCall" status. This corresponds to the case when the agent has access to at least one phone that is not being used. This priority setting is achieved by putting "WaitForNextCall" as the highest priority in the agent SPT.

In one embodiment of an agent SPT, the priority of the states are listed sequentially and separated by a comma, with the lowest priority listed first. The agent SPT with a lowest priority for "WaitForNextCall" would be: "WaitforNextCall, . . . (other states)." On the other hand, the agent SPT with a very high priority for "WaitForNextCall" would be ". . . , WaitForNextCall, LoggedOut". In this case, the highest priority is "LoggedOut" and the priority just below it is "WaitForNextCall".

Agents can be arranged in groups. Group status is based on all included agent statuses. It is determined by a "Group SPT," which is similar to the Agent SPT and DN SPT. As an example, a Group SPT of ". . . , WaitForNextCall" means that the group will be in "WaitForNextCall" if there is at least one "WaitForNextCall" agent status.

Routing points and queues can also report different status to different clients in respond to different SPTs. The states of an exemplary routing point/queue are shown in table 2.

TABLE 2

| | | |
|---|---|---|
| (1) | NotMonitored: | The CTI server is not currently tracking the status of this DN. Consequently, the stat-server is not accumulating statistical information for this-DN |
| (2) | Monitored: | The routing point/queue is monitored by the CTI server. |
| (3) | NotReadyForNextCall: | This state occurs when a PBX source used for routing or a queue DN has reached capacity. Note that this capacity is very large and is not normally reached. |
| (4) | CallWait: | Call is holding on a routing point/queue |
| (5) | CallEntered: | This is an "instant" action indicating that a new call has just entered a routing point or queue. |
| (6) | CallDistributed: | It indicates that a call previously in a routing point/queue has just been delivered to an agent. |
| (7) | CallAbandoned: | This indicates that a customer just hung up while the call is at a routing point or in a queue. |
| (8) | WaitForNextCall: | This indicates that a routing point/queue still has a capacity to handle more calls. |

In one embodiment of the present invention, there are two main calls that allow clients to obtain statistics from the stat-server. The first call is "SGetStat." This call requests the stat-server to return statistics of interest only once. The second call is "SOpenStat." It means that the client is interested in receiving statistics on a continuous basis. The client can further set up various criteria for the stat-server to notify the client and report statistics. For example, the client can specify that notification takes place only when the new value is greater than the last reported value by a predefined percentage. Alternatively, the client can specify that notification takes place at predefined time intervals.

One of the parameters of the SGetStat and SOpenStat calls relates to the SPT. In one embodiment of the present embodiment, the parameters for each of these calls contain a pointer to a data structure having a number of optional fields. The SPT for agent DN, agent, group, and routing point/queue each occupies one of these optional fields. Thus, an application can define the appropriate SPTs and incorporate them in the data structure. This data structure is used to invoke the SGetStat and SOpenStat calls.

In an embodiment in which multiple switches are monitored by the same stat-server, the above mentioned calls also contain a parameter allowing the client to indicate the switch of interest.

The invention has been described with reference to specific exemplary embodiments thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for reporting status of an entity in the physical environment of a call center comprising the steps of:
   a) monitoring by a reporting application the active states of an entity having a plurality of possible object states;
   b) providing, by a requesting application, a prioritized list of the possible object states, and a request for at least one active state; and c) providing to the requesting application, by the reporting application, the entity state being both active and having the highest priority in the list provided by the requesting application.

2. The method of claim 1 wherein in step (b) the requesting application requests more than one state and in step (c) the reporting application provides the active state having the highest priority and an active state having a priority other than the highest priority.

3. The method of claim 2 wherein the states provided by the reporting application to the requesting application are the states having highest priority in order of priority.

4. The method of claim 2 wherein at least one of said reported states corresponds to a default state.

5. The method of claim 1 wherein said call center has an automatic call distributor (ACD) using a plurality of agent directory numbers, said entity being one of said agent directory numbers.

6. The method of claim 1 wherein said entity is an agent having access to one or more telephones, each telephone being addressed by one of a plurality of agent directory numbers.

7. The method of claim 6 wherein said agent has access to at least a first and a second telephone, said first telephone is at a first active state and said second telephone is at a second active state, wherein the reporting application provides to the requesting application one of said first and said second active states as said agent status.

8. The method of claim 1 wherein said call center has an automatic call distributor having at least one internal routing point, said entity being said at least one routing point.

9. The method of claim 1 wherein said call center has an automatic call distributor containing at least one queue, said entity being said at least one queue.

10. A method for reporting status of an entity in the physical environment of a call center, wherein said entity may be in one or more active states out of a plurality of possible states, each of said possible states relating to an operation of said entity in said call center, comprising the steps of:
    a) monitoring active states of said entity;
    b) providing, by said requesting application, to said reporting application a first prioritized list of the possible entity states at a first time;
    c) providing by said reporting application to said requesting application, a first status of said entity, having both an active state and the highest priority in the prioritized list;
    d) providing, by the reporting application to the requesting application, a second prioritized list of the possible entity states at a second time; and
    e) providing by said reporting application to said requesting application, a second status of said entity based on said second priority list and said active states of said entity;

wherein said second status is a status other than the said first status.

11. The method of claim 10 wherein said first status corresponds to one of said active states having a highest priority in said first priority list and said second status corresponds to one of said active states having a highest priority in said second priority list.

12. The method of claim 10 wherein said first and said second status correspond to said active states having a predetermined priority in said first and said second lists.

* * * * *